United States Patent [19]
Woodbury et al.

[11] Patent Number: 5,621,164
[45] Date of Patent: Apr. 15, 1997

[54] LEAK TEST SYSTEM

[76] Inventors: H. Allan Woodbury; James R. North, both of 535 S. 300 West, Salt Lake City, Utah 84101

[21] Appl. No.: 379,948

[22] Filed: Jan. 27, 1995

[51] Int. Cl.$^6$ .................................................. G01M 3/08
[52] U.S. Cl. ........................................ 73/40.5 R; 73/46
[58] Field of Search ............................ 73/40.5 R, 46, 73/40; 431/16–19

[56] References Cited

U.S. PATENT DOCUMENTS

| | | | |
|---|---|---|---|
| 3,304,764 | 2/1967 | Bracken et al. | 73/46 |
| 3,521,481 | 7/1970 | Tyrone . | |
| 3,575,197 | 4/1971 | Ray . | |
| 3,583,842 | 6/1971 | Hancock et al. | 431/16 |
| 3,800,586 | 4/1974 | Delatorre et al. | 73/49.2 |
| 3,818,752 | 6/1974 | Lindeberg | 73/49.2 |
| 3,827,285 | 8/1974 | Grove . | |
| 3,983,913 | 10/1976 | Bower | 141/95 |
| 4,573,343 | 3/1986 | Huiber . | |
| 4,573,344 | 3/1986 | Ezekoye . | |
| 4,587,619 | 5/1986 | Converse et al. | 364/552 |
| 4,666,494 | 5/1987 | Strizke et al. | 65/32 |
| 4,806,913 | 2/1989 | Schmidt . | |
| 4,821,769 | 4/1989 | Mills et al. . | |
| 4,825,198 | 4/1989 | Rolker et al. | 340/605 |
| 4,915,613 | 4/1990 | Landis et al. | 431/6 |
| 4,916,437 | 4/1990 | Gazzaz . | |
| 4,916,938 | 4/1990 | Aikin et al. . | |

FOREIGN PATENT DOCUMENTS

| | | | |
|---|---|---|---|
| 184836A | 6/1986 | European Pat. Off. | G01M 3/28 |
| 3409050 | 9/1985 | Germany | F23M 11/00 |
| 0096525 | 4/1989 | Japan | 73/46 |

OTHER PUBLICATIONS

Gas Safety Shutoff Valve Leak Testing Procedure, Coen Instruction Manual.

*Primary Examiner*—Hezron E. Williams
*Assistant Examiner*—Jay L. Politzer
*Attorney, Agent, or Firm*—Thorpe North & Western, L.L.P.

[57] ABSTRACT

A leak test system is disclosed for a double block and bleed valve arrangement, the system including a second vent valve disposed along the bleed line and a secondary gas supply line connected to the bleed line for introducing gas at a known pressure into the bleed line to test the valves and ensure that they are not leaking. A pressure switch and pressure gauge monitor are positioned to monitor the pressure within the bleed line. The pressure switch activates an alarm if the pressure in the bleed line changes, thereby indicating a leak. A method for testing each valve in the arrangement is also disclosed.

22 Claims, 4 Drawing Sheets

LEAK TEST SYSTEM

BACKGROUND OF THE INVENTION

The present invention relates to a system and method for testing combustible gas leaks through valves, and in particular, to test for leaks through gas control valves on a "double block and bleed" arrangement.

Various arrangements for gas piping have been developed to promote safe operation of burners, and to prevent explosions in the event of a leak in a safety shutoff valve used to prevent gas from reaching the burner when it is not in use. The most common of these arrangements is commonly referred to as the "double block and bleed" arrangement. In its most basic form, the arrangement requires two automatic (motor or solenoid-operated) safety shutoff valves mounted in series along the gas supply line in order to provide redundant shutoff capability along the gas line. These valves are designed as "fail-closed." In other words, in the event of valve failure, the valve will close and prevent gas from passing therethrough.

In addition, a bleed line is connected to the gas line between these two valves and is vented to atmosphere through another automatic valve, commonly referred to as the vent valve, which is designed as "fail-open", i.e. in the event of failure, the valve will automatically open and allow any gas in the bleed line to escape. The bleed line and the vent valve serve to remove any gas which might leak through the first safety shutoff valve into the gas supply line between the first and second safety shutoff valves.

Downstream of each safety shutoff valve, a valved test port is usually provided to check for leakage through the safety shutoff valves while the burner is off. In some cases provision is made to energize/close the vent valve (or a manual locked valve ahead of the vent valve) to assist in the testing procedure. A manual shutoff cock is often installed downstream of both safety shutoff valves in order to facilitate the testing. While many systems presently available have recognized the need to test the safety shutoff valves and have provided methods for doing so, there are presently few, if any, systems which test for leakage through the vent valve.

If the vent valve leaks, gas escapes through the bleed line to atmosphere while the burner is on. While such gas loss will usually not present a significant safety hazard, potential fuel gas loss through a defective vent valve is significant enough to justify the use of a leak test system to minimize the loss of gas. This is especially so if the system is simple to use and, as an added benefit, provides additional methods for detecting leakage through the safety shutoff valves, thus providing a backup leak test system for the safety shutoff valves. Therefore, there is a need for a leak test system which will test for leakage occurring through the vent valve, in addition to being able to test for leakage through the safety shutoff valves positioned in series along the gas supply line.

SUMMARY OF THE INVENTION

It is an object of the present invention to provide a system for testing the vent valve of a double block and bleed gas supply arrangement.

It is another object of the present invention to provide a system for testing the vent valve of a double block and bleed arrangement which will also conduct backup leak tests for the safety shutoff valves.

It is another object of the invention to provide such a system which will enable the user to prevent the loss of gas vented to atmosphere by leaking vent valves.

The above and other objects of the invention are realized in specific illustrated embodiments of a leak detection system including a secondary vent valve disposed in sequence with a traditional vent valve along a bleed line of a double block and bleed arrangement. A secondary gas supply line is attached to the bleed line so as to supply gas to the bleed line between the first and second vent valves. The secondary gas supply line includes a valve so that the secondary gas supply line may be controlled to only emit gas into the bleed line when testing the valves of the system. A gauge and pressure sensor are provided, preferably along the secondary gas supply line to monitor pressure and for use in determining whether there are leaks in the valves.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
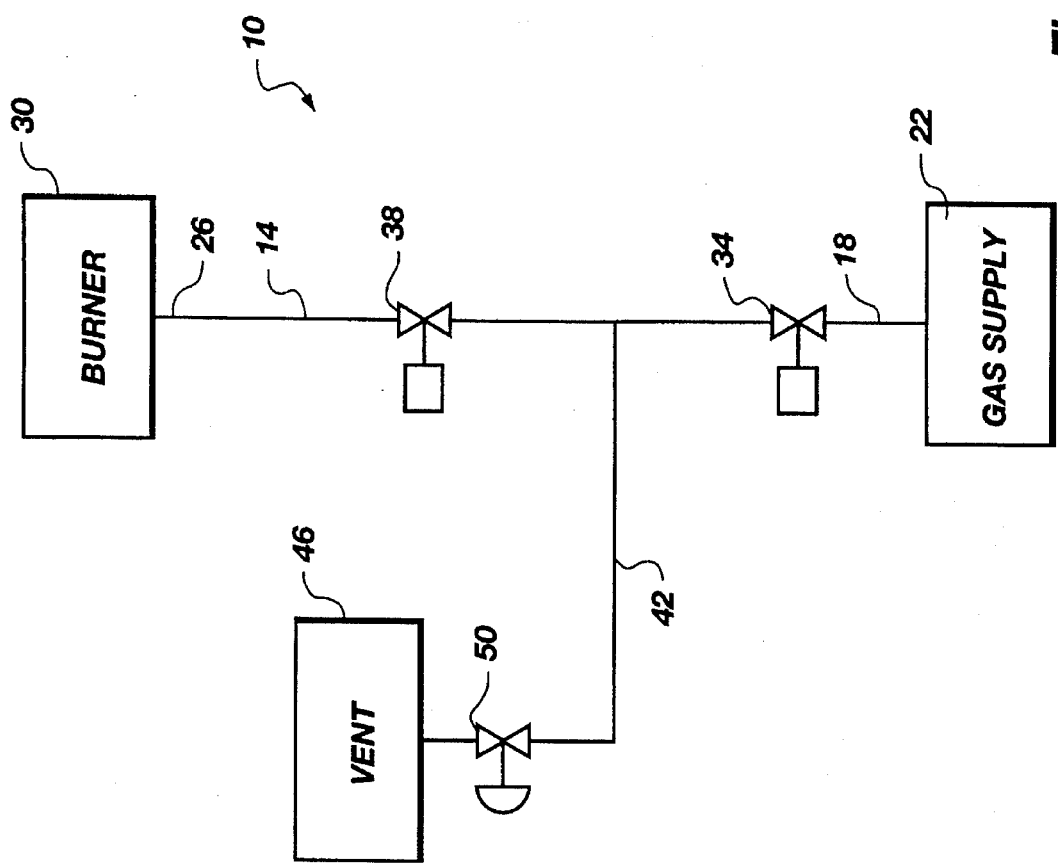
FIG. 1 is a schematic of prior art "double block and bleed" leak test systems which are typically used with commercial burners.

Reference will now be made to the drawings in which the various elements of the present invention will be given numeral designations and in which the invention will be discussed so as to enable one skilled in the art to make and use the invention. Referring to FIG. 1, there is shown a simplified valve safety system, generally indicated at 10, which is commonly referred to as a double block and bleed arrangement. The system 10 includes a gas supply line 14 which connects at a proximal end 18 to a gas supply 22 and at a distal end 26 to a commercial burner 30.

Disposed along the gas supply line 14 are first and second automatic safety shutoff valves 34 and 38, respectively. The safety shutoff valves 34 and 38 are automatic, i.e. motor or solenoid operated, and designed to automatically close in the event of valve failure. By placing the safety shutoff valves 34 and 38 in series, as is shown in FIG. 1, the valves provide a "double block" to gas in the supply line 14 to prevent gas from being supplied to the burner 30 when it is turned off. This is critically important because leaking gas can build up around the burner and cause explosions if the gas is still present when the burner is reignited.

In order to add additional safety to the arrangement, a bleed line 42 extends from the gas supply line 14 between the first safety shutoff valve 34 and the second safety shutoff valve 38. The bleed line 42 is vented by a vent 46 which releases gas passing through the bleed line to the atmosphere.

A vent valve 50 is disposed along the bleed line 42 between the gas supply line 14 and the vent 46. The vent valve 50 is designed to fail open so that gas flowing through the bleed line 42 will not backup due to a valve failure and risk flow through the second safety shutoff valve 38. The major problem with the arrangement shown in FIG. 1 is that the flow through the bleed line 42 when the safety shutoff valves are open is limited only by the vent valve 50. If the valve 50 is leaking, a significant amount of gas can escape out the vent 46 and into the atmosphere. While such a situation does not usually pose a significant safety threat, considerable amounts of gas may be lost. By providing a relatively simple and inexpensive mechanism to ensure that the vent valve 50 is not leaking, the leak test system will save money and the waste of a valuable resource.

Figure 2:
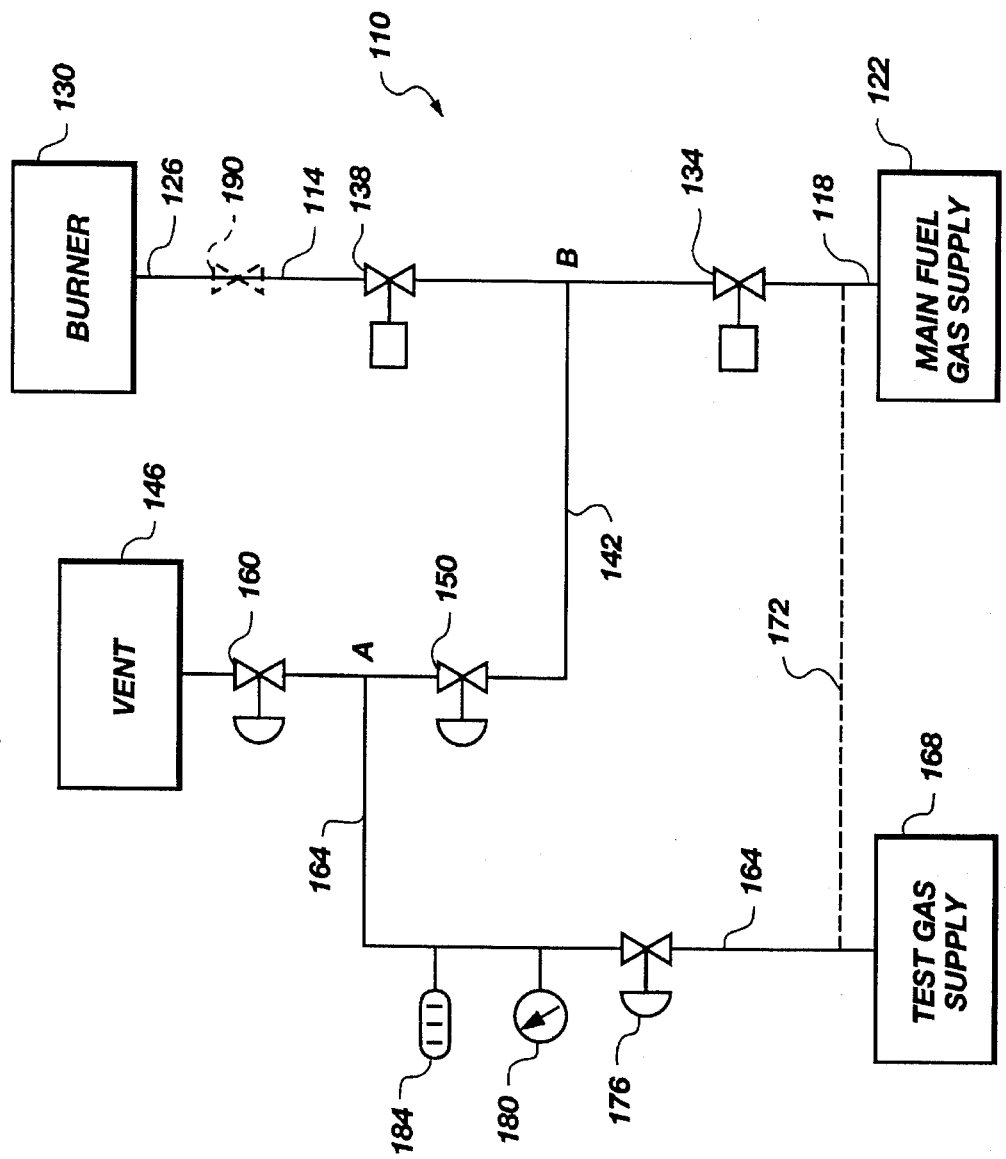
FIG. 2 is a schematic of the leak test system including a double block and bleed arrangement made in accordance with the principles of the present invention.

Referring now to FIG. 2, there is shown an embodiment of the present invention comprising a leak test system, generally indicated at 110. The gas supply line 114 is connected at a proximal end 118 to a main fuel gas supply 122 and at a distal end 126 to a burner 130 as was discussed with respect to FIG. 1. The supply line 114 also has first and second safety shutoff valves, 134 and 138, respectively. A bleed line 142 is attached to the supply line 114 between the first safety shutoff valve 134 and the second safety shutoff valve 138.

The bleed line 142 extends from the supply line 114 to a vent 146 and a first vent valve 150 is provided between the vent and the connection of the bleed line 142 with the gas supply line 114 in the same manner as the prior art discussed regarding FIG. 1. In addition, a second vent valve 160 is positioned between the first vent valve 150 and the vent 146. A test gas supply line 164 connects to the bleed line 142 between the first vent valve 150 and the second vent valve 160. The test gas supply line 164 is connected to a test gas supply 168. While the test gas supply will preferentially be a container holding nonflammable gas, represented by 168, it could be a supply line 172 which connects to the main fuel gas supply line 114 at a point proximal to the first safety shutoff valve 134.

Along the test gas supply line 164 is a control valve 176, for controlling gas flow through the line. Disposed between the control valve 176 and the second vent valve 160 are a pressure gauge 180 and a pressure switch 184. While the parts discussed thus far are all readily available, their combination as described enables not only testing of the first vent valve 150 for leaks, but also back-up testing of the safety control valves 134 and 138.

With the above described arrangements many tests may be performed to ensure safety while decreasing the loss of gas through the first vent valve 150. To assist those skilled in the art to use the invention, a sample of a test series is provided.

In order to test the vent valves 150 and 160 while the burner 130 is operating to determine if either valve is leaking, the following steps would be followed. Note that because the safety shutoff valves 134 and 138 are open, vent valve 150 is already energized in a closed position.

A button on a control panel (discussed regarding FIG. 3) is pressed. This in turn starts a first timing sequence. The second vent valve 160 is energized into a closed position and the control valve 176 remains closed. If the first vent valve 150 is leaking, pressure will increase in the bleed line 142 between the first vent valve 150 and the second vent valve 160, the area of which is hereinafter referred to as point A. The increase in pressure will cause the pressure switch 184 to trigger an alarm (discussed with respect to FIG. 3).

The pressure gauge 180 provides visual evidence of the pressure increase, and thus gives some indication of the severity of the leak. If the first vent valve 150 is not leaking, there will be no pressure increase and thus no alarm during the timing sequence. The length of the timing sequence, of course, will be dependant on numerous factors such as the size of the bleed line 142, and how accurate the user desires the test to be. While a timing sequence of an extraordinary length of time may find a very small leak, such a test may not be practical in light of the minimal amount of gas which would be lost by such a leak.

Figure 3:
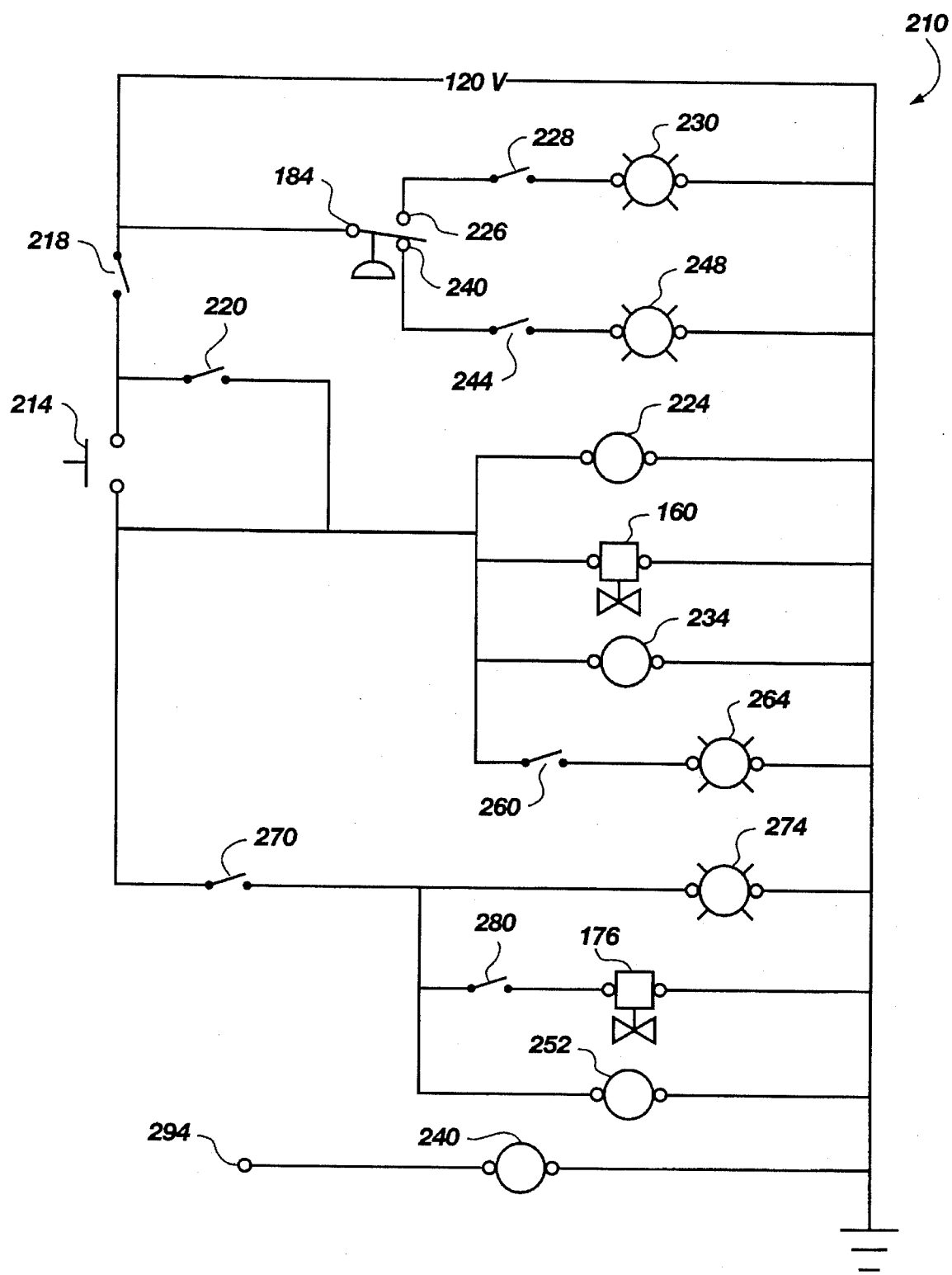
FIG. 3 is a schematic of circuitry which is used to test for leaks within the system in accordance with the principles of the present invention.

Once the first timing sequence ends, a second sequence begins. The control valve 176 is energized so as to open long enough to admit a test gas of known pressure to point A. The first vent valve 150 and the second vent valve 160 remains energized in a closed position. The control valve 176 is then de-energized so that it closes. If the second vent valve 160 is leaking, pressure at point A will drop. The drop in pressure causes the pressure switch 184 to send a signal triggering an alarm (FIG. 3). Sufficient time delay is allowed to accommodate a slow leak rate. If there is no measurable pressure loss at point A during the second timing sequence, the second vent valve 160 is not leaking, or is leaking at so minimal a rate as to be unimportant. Following these two timing sequences, the second vent valve 160 is de-energized so that it is in an open position.

Prior to conducting the following tests, the burner 130 would be turned off so that the safety shutoff valves 134 and 138 may be tested. Burner shutdown automatically closes the safety shutoff valves 134 and 138, and opens valve 150. The push button (FIG. 3) of a control panel (FIG. 3) is pressed in order to start a timing sequence. The second vent valve 160 is energized closed and the control valve 176 remains closed. A testing time interval begins. If the first safety shutoff valve 134 is leaking, pressure will increase between the first safety shutoff valve and the second safety shutoff valve 138, hereinafter referred to as point B. This will also cause an increase in pressure at point A, as the first vent valve 150 has been de-energized open. The increased pressure at point A (or point B) causes an alarm by means of the pressure switch 184. The pressure gauge 180 provides visual evidence of the condition at point B. If the first safety shutoff valve 134 is not leaking, there will be no increase in pressure at points A or B during the timing interval, and thus there will be no alarm.

Once the timing interval ends, the control valve 176 is energized open long enough to admit a test gas of known pressure through the supply line 164 and bleed line 142 to point B. The second vent valve 160 remains energized closed and the first vent valve 150 remains de-energized open.

The gas introduced from the test gas supply line 164 through the control valve 176 is preferably a nonflammable gas such as nitrogen. If the second safety shutoff valve 138 is leaking, the gas reaching the burner 130 will not risk an explosion, etc. However, as was noted above, the test gas supply could come from the supply line 114 proximal to the first safety shutoff valve and through a supply line 172. If such is used, it is strongly recommended that an additional safety valve 190 be used distal to the second safety shutoff valve 138 so that flammable gas will not leak to the burner 130.

After the known pressure is introduced, the pressure is monitored for a given period of time. If the second safety shutoff valve 138 is leaking, pressure at points A and B will drop. The drop in pressure will be indicated by an alarm (FIG. 3) activated by the pressure switch 184 and the magnitude of the change is readable by the pressure gauge 176. Sufficient time delay must be allowed to accommodate a slow leak rate.

Following this last time interval, the second vent valve 160 is de-energized so that the first and second venting valves 150 and 160 are open, and that the control valve 176 and the first and second safety shutoff valves 134 and 138 are closed. In such a situation, the system 110 operates the same as a traditional double block and bleed system 10 shown in FIG. 1.

If as may rarely be the case, the leak test signals a leak in both the first vent valve 150 and the first safety shutoff valve 134, it is more likely that control valve 176 is leaking than both of the other two. For verification that the control valve 176 is leaking, simply shut off the supply through the supply line 164 to the control valve, and repeat the test for either the first vent valve 150 or the first safety shutoff valve 134. If no high pressure alarm occurs (i.e. the first alarm disclosed below in FIG. 3), then the control valve 176 is likely leaking.

If the leak test signals a leak in both the second vent valve 160 and the second safety shutoff valve 138, then it is more likely that control valve 176 is failing to open, than for both of the other two to be leaking. For verification that the control valve is failing to open, close the manual shutoff valve 190 downstream of the second safety shutoff valve 138, and repeat the leak test for the second safety shutoff valve. If an alarm still signals a leak, then control valve 176 is likely failing to open.

Referring now to FIG. 3, there is shown a schematic of the control logic circuitry 210 which would be connected to the pressure switch 184 of FIG. 2. A push button 214 activates the control circuitry 210. Above the push button 214 is a burner safety interlock relay contact 218 which is normally closed and a timer relay contact 220 which is normally open and which communicates with a timer delay relay 224 to complete the circuit loop if no alarms occur during the designated time interval.

Above the burner safety interlock relay contact 218 is the pressure switch 184 which is normally in a closed position. When open, the pressure switch 184 communicates with a contact 226 connected to a normally closed relay contact 228 and a first alarm 230. The normally closed relay contact 228 is responsive to a first timer delay relay 234 (positioned in the middle of FIG. 3). When the pressure switch 184 is closed, it engages a contact 240 which is connected to a normally open relay contact 244 and a second alarm 248. The relay contact 270 communicates with the second timer 252 near the bottom of the page.

Positioned between the timer delay relay 224 and the first timer delay relay 234 is the second vent valve 160. Below the first timer delay relay 234 are a normally closed relay contact 260 and a first test lamp 264. The relay contact 260 is in communication with the first timer delay relay 234. So is the normally open relay contact 270 positioned on the line below the relay contact 260 along with a second test lamp 274. Below the second test lamp 274 are positioned a normally closed relay contact 280 which communicates with the second timer delay relay 252 and the control valve 176.

Below these relays, etc., are disposed the burner safety interlock relay 290 which communicates with the relay contact 218. The burner safety interlock relay 290 is in turn connected to the burner alarm terminal 294. By using this simple circuitry, and following the steps discussed above, each of the vent valves and safety shutoff valves can be routinely checked to ensure that no leakage is occurring.

Figure 4:
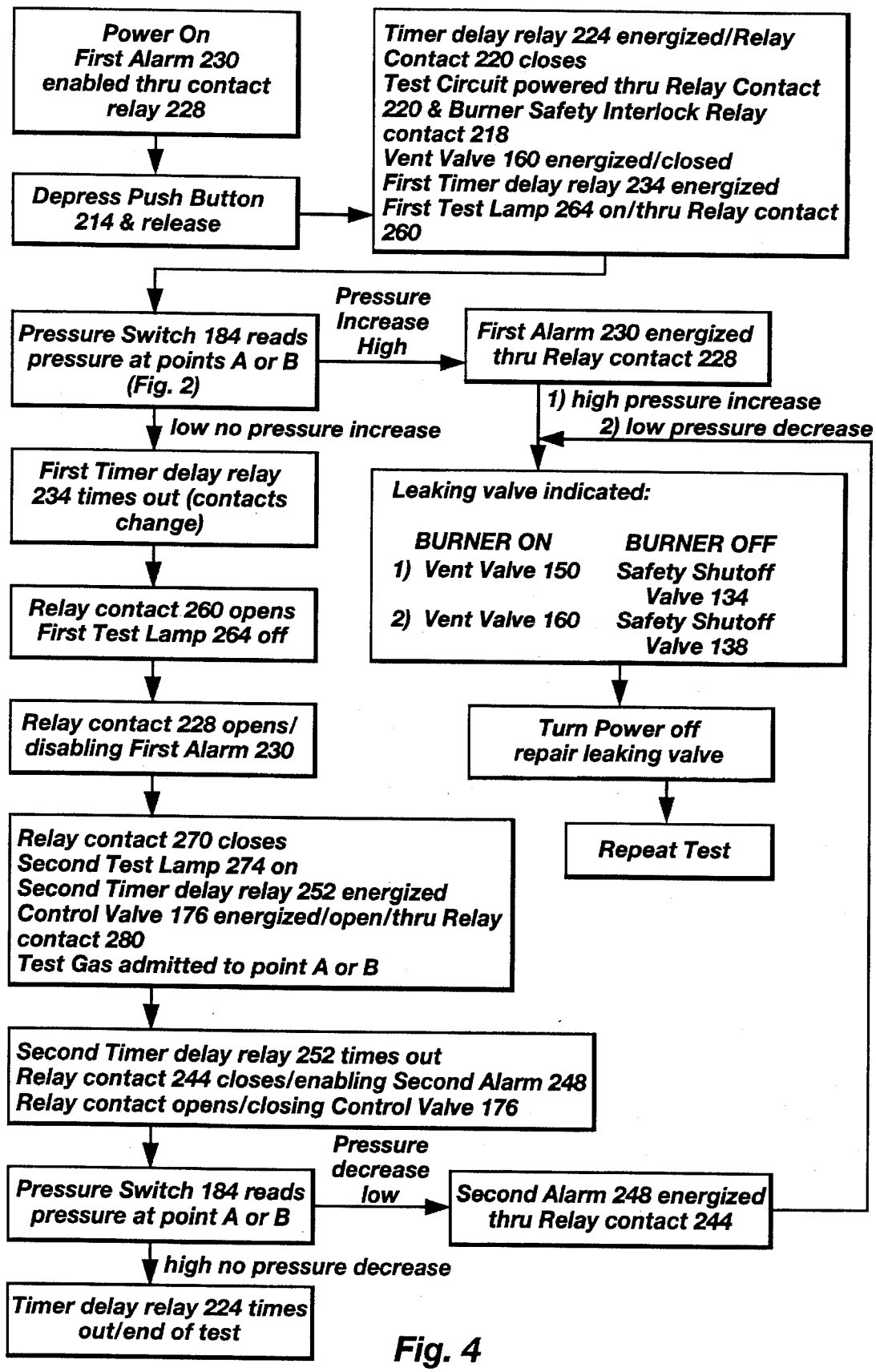
FIG. 4 shows a flow chart of steps which may be taken in performing leak tests with the leak test system of the present invention.

Referring now to FIG. 4, there is shown a flow chart for carrying out the tests described. Those skilled in the art will recognize numerous other circuit arrangements that could be used to accomplish the same functions.

While the leak test system discussed above has been described with respect to a single burner system, the system may also be applied to multiple burner arrangements. Typically there is one proximal safety shutoff valve (such as valve 134 in FIG. 2) and one vent valve (such as valve 150), to serve all burners, and a distal, second safety shutoff valve (such as valve 138 in FIG. 2), for each individual burner. The second safety shutoff valve, for any individual burner, may be tested by simply closing the manual "burner shutoff valves" on all remaining burner gas trains. Testing the first shutoff valve, and the vent valves would be unaffected.

Additionally, the alarm circuit (shown in FIG. 3), if left enabled, can detect a pressure condition at point A on a continuous basis. This can serve as a useful safety monitor. A sudden change in pressure would be noted by the circuit and the user warned.

In the manner described above, a leak test system is disclosed. The system provides a method for testing a vent valve to ensure that the valve is not leaking, as well as a backup system to check other valves. Those skilled in the art will recognize numerous additions and modifications which can be made to the system described herein and to systems accomplishing the same function. The appended claims are intended to cover such modifications.

What is claimed is:

1. A leak test system for a double block and bleed valve arrangement having first and second safety shutoff valves disposed along a gas supply line, and a vented bleed line extending from the gas supply line between the first and second safety shutoff valves with a vent valve disposed along the bleed line, the leak test system comprising:

a second vent valve disposed along the bleed line downstream from the vent valve; and pressure monitoring means in communication with the bleed line for monitoring pressure in the bleed line between the first and second vent valves.

2. The leak test system of claim 1, wherein the pressure monitoring means comprises a pressure switch and an alarm responsive to the pressure switch such that changes in pressure cause the pressure switch to activate the alarm.

3. The leak test system of claim 2, wherein the pressure monitoring means further comprises a pressure gauge for giving a visual indication of an amount of pressure change in the bleed line.

4. The leak test system of claim 1, wherein the system further comprises a secondary gas supply line connected to the bleed line between the first and second vent valves.

5. The leak test system of claim 4 wherein the system further includes a secondary gas supply means for providing gas to secondary gas supply line.

6. The leak test system of claim 5, wherein the secondary gas supply means supplies a nonflammable gas.

7. The leak test system of claim 5, wherein the secondary gas supply means comprises a supply line connected to the gas supply line.

8. The leak test system of claim 7, wherein the gas supply line has a proximal portion disposed upstream from the first safety shutoff valve, and wherein the secondary gas supply line is connected to the proximal portion of the gas supply line.

9. The leak test system of claim 4, wherein the system further comprises a control valve disposed along the secondary gas supply line for selectively allowing gas to flow through the secondary gas supply line.

10. A leak test system for monitoring leakage through a first vent valve disposed on the bleed line of a double block and bleed arrangement, the system comprising:

a secondary vent valve disposed along the bleed line at a point distal to the first vent valve;

pressure monitoring means for monitoring pressure in the bleed line between the first and second vent valves; and secondary gas supply means connected to the bleed line between the first and second vent valves for introducing gas into the bleed line between the first and second vent valves to achieve a known pressure.

11. The leak test system of claim 10, wherein the pressure monitoring means comprises a pressure switch and an alarm activated by the pressure switch.

12. The leak test system of claim 11, wherein the pressure monitoring system comprises a pressure gauge in communication with the bleed line for measuring pressure between the first and second vent valves.

13. The leak test system of claim 12, wherein at least a portion of the pressure monitoring means is positioned along the gas supply means.

14. The leak test system of claim 10, wherein the gas supply means comprises a nonflammable gas supply.

15. The leak test system of claim 10, wherein the secondary gas supply means comprises a control valve for selectively controlling the supply of gas through the secondary gas supply means.

16. A method for testing leakage in a double block and bleed valve arrangement having a gas supply line, first and second safety shutoff valves disposed along the gas supply line in series, a vented bleed line extending from the gas supply line between the first and second safety shutoff valves and a vent valve disposed along the bleed line between the gas supply line and a vent, the method comprising:

a) providing a second vent valve disposed between the vent valve and the vent;

b) closing the second vent valve and selectively opening and closing the other valves prior to a time interval to isolate gas supply line segments for detection of leaks through valves bounding the segments;

c) causing known gas pressure to be present in the bleed line between the first and second vent valves at a beginning of the time interval; and d) monitoring the gas pressure during the time interval and identifying any change in pressure.

17. The method according to claim 16, wherein the steps b) through d) comprise, more specifically, b) closing the vent valve prior to the time interval;

c) causing a known pressure of gas to be present between the vent valve and the second vent valve; and d) monitoring the gas pressure between the vent valve and the second vent valve during the time interval and indicating a leak in the valves if there is a decrease in pressure between the vent valve and the second vent valve during the time interval.

18. The method according to claim 16, wherein the steps b) through d) comprise, more specifically, b) opening the vent valve and closing the first and second safety shutoff valves prior to the time interval;

c) causing a known pressure of gas to be present between the vent valve and the second vent valve; and d) monitoring the gas pressure between the vent valve and the second vent valve during the timed sequence and indicating a leak in the valves if the pressure changes during the time interval.

19. The method according to claim 18, further comprising generating a perceptible alarm signal in response to an increase in pressure, thereby indicating that the first safety shutoff valve is leaking.

20. The method according to claim 18, further comprising generating a perceptible alarm signal in response to a decrease in pressure, thereby indicating that the second safety shutoff valve is leaking.

21. The method according to claim 18, wherein the step c) comprises, more specifically, feeding gas from a secondary gas supply into the bleed line between the first and second safety shutoff valves to achieve a known gas pressure.

22. The method according to claim 21, wherein the fed gas is nonflammable.

* * * * *